(12) United States Patent
Houussaye (10) Patent No.: US 12,339,185 B2
(45) Date of Patent: Jun. 24, 2025

(54) HYDRAULIC TORQUE MEASUREMENT DEVICE FOR AIRCRAFT ENGINE UNIT

(71) Applicant: SAFRAN HELICOPTER ENGINES, Bordes (FR)

(72) Inventor: Laurent Louis Sylvain Houssaye, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 268 days.

(21) Appl. No.: 17/998,885

(22) PCT Filed: May 9, 2021

(86) PCT No.: PCT/FR2021/050791
§ 371 (c)(1),
(2) Date: Nov. 15, 2022

(87) PCT Pub. No.: WO2021/234239
PCT Pub. Date: Nov. 25, 2021

(65) Prior Publication Data
US 2023/0213399 A1 Jul. 6, 2023

(30) Foreign Application Priority Data
May 19, 2020 (FR) ...................................... 2005064

(51) Int. Cl.
*G01L 3/14* (2006.01)
*G01L 5/12* (2006.01)
(Continued)

(52) U.S. Cl.
CPC .............. *G01L 3/1414* (2013.01); *G01L 5/12* (2013.01); *G01M 15/02* (2013.01); *G01L 1/02* (2013.01)

(58) Field of Classification Search
CPC . G01L 5/12; G01L 1/02; G01L 3/1414; G01L 3/85; G01M 15/00; G01M 15/02; G01D 5/42
See application file for complete search history.

(56) References Cited

U.S. PATENT DOCUMENTS 3,261,203 A * 7/1966 Young ...................... G01G 5/00
177/208
3,587,304 A 6/1971 Eckart
(Continued)

OTHER PUBLICATIONS

International Search Report mailed Aug. 27, 2021, issued in corresponding International Application No. PCT/FR2021/050791, filed May 9, 2021, 5 pages.
(Continued)

*Primary Examiner* — Benjamin R Schmitt
(74) *Attorney, Agent, or Firm* — CHRISTENSEN O'CONNOR JOHNSON KINDNESS PLLC (57) ABSTRACT

A hydraulic torque measurement device for an aircraft engine unit includes a hermetically sealed enclosure having a rigid wall and a deformable wall that define an internal volume. The device further includes at least one pressure measuring element capable of measuring the pressure prevailing in the internal volume. The hydraulic torque measuring device allows a service state in which the internal volume is filled exclusively with an incompressible liquid, and in which the deformable wall is configured to be subjected to a pressure force. In some embodiments, the hydraulic torque measurement device is suitable for use with a gearbox.

11 Claims, 5 Drawing Sheets

(51) Int. Cl.
*G01M 15/02* (2006.01)
*G01L 1/02* (2006.01)

(56) References Cited

U.S. PATENT DOCUMENTS

| | | |
|---|---|---|
| 5,337,612 A | 8/1994 | Evans |
| 2006/0287778 A1* | 12/2006 | Oltheten ................ G01D 7/02 |
| | | 701/1 |
| 2017/0261390 A1* | 9/2017 | Houssaye ............ F01D 21/003 |

OTHER PUBLICATIONS

Written Opinion mailed Aug. 27, 2021, issued in corresponding International Application No. PCT/FR2021/050791, filed May 9, 2021, 5 pages.

English translation of Written Opinion mailed Aug. 27, 2021, issued in corresponding International Application No. PCT/FR2021/050791, filed May 9, 2021, 6 pages.

International Preliminary Report on Patentability mailed Nov. 17, 2022, issued in corresponding International Application No. PCT/FR2021/050791, filed May 9, 2021, 6 pages.

* cited by examiner

HYDRAULIC TORQUE MEASUREMENT DEVICE FOR AIRCRAFT ENGINE UNIT

FIELD OF THE DISCLOSURE

The present disclosure relates to a hydraulic torque meter, in particular for an aircraft engine.

BACKGROUND

The technical background comprises in particular the documents U.S. Pat. Nos. 3,587,304 A1 and 5,337,612 A1.

In the aeronautical field, hydraulic torque meters are known which rely on an automatic hydraulic pressure regulation mechanism in the torque measurement. The hydraulic pressure regulated by the aforementioned mechanism is a simple function of the torque delivered by the associated engine. The axial thrust on one or more intermediate sprockets, for example helical toothing, of a reducer is proportional to the torque transmitted through this reducer. A sensor measures this regulated hydraulic pressure and, taking into account some conformation coefficients determined during the acceptance test of the engine, a calculator deduces from this pressure measurement the torque actually delivered by the engine.

Such a known hydraulic torque meter 320, implemented in a gearbox 300 of a helicopter engine unit (not shown), is described with reference to FIGS. 1, 2A, 2B and 3.

Figure 1:
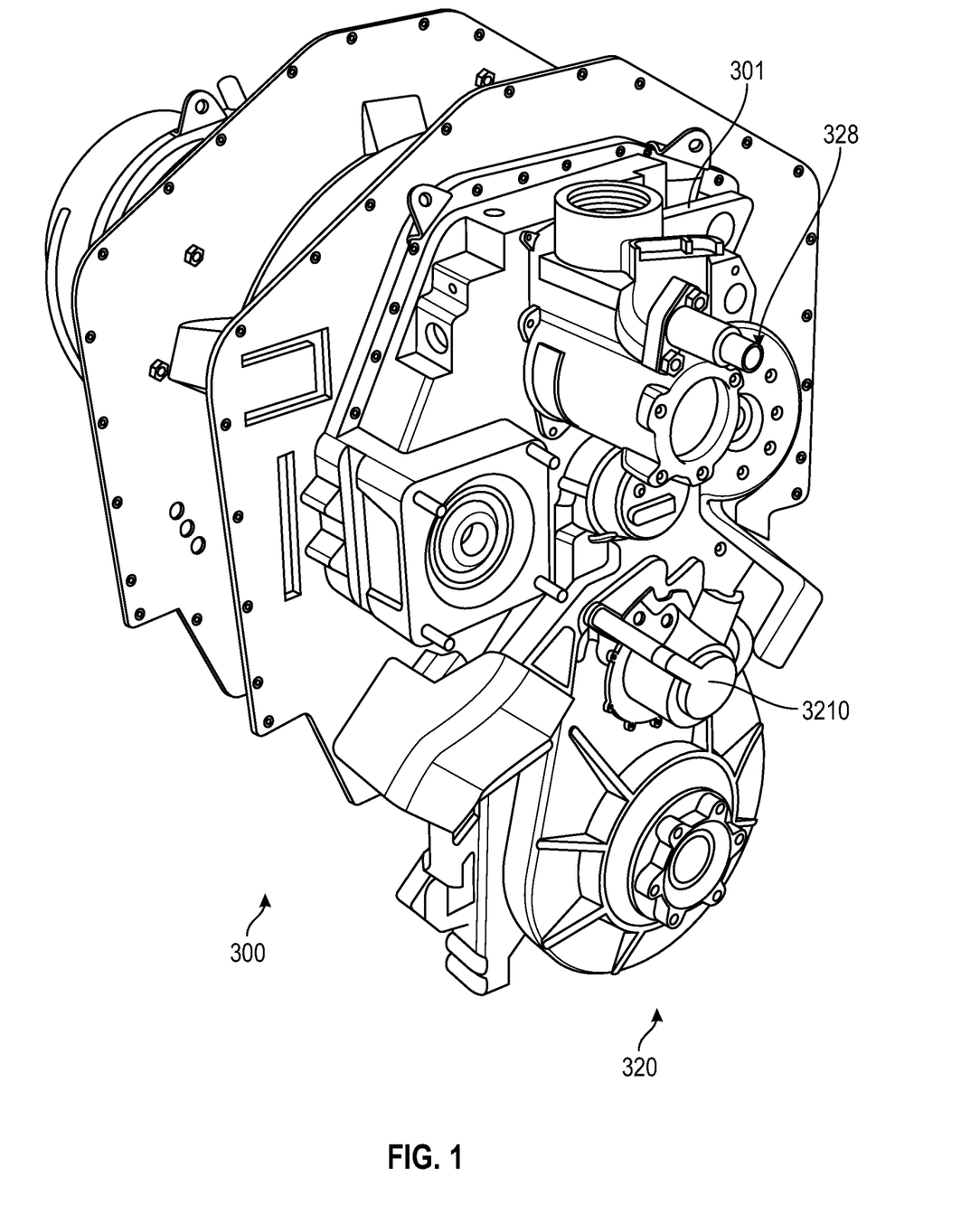
FIG. 1 is a perspective view of a gearbox of an aircraft engine unit according to the prior art, having a torque meter provided with a pressure sensor.
Figure 2A:
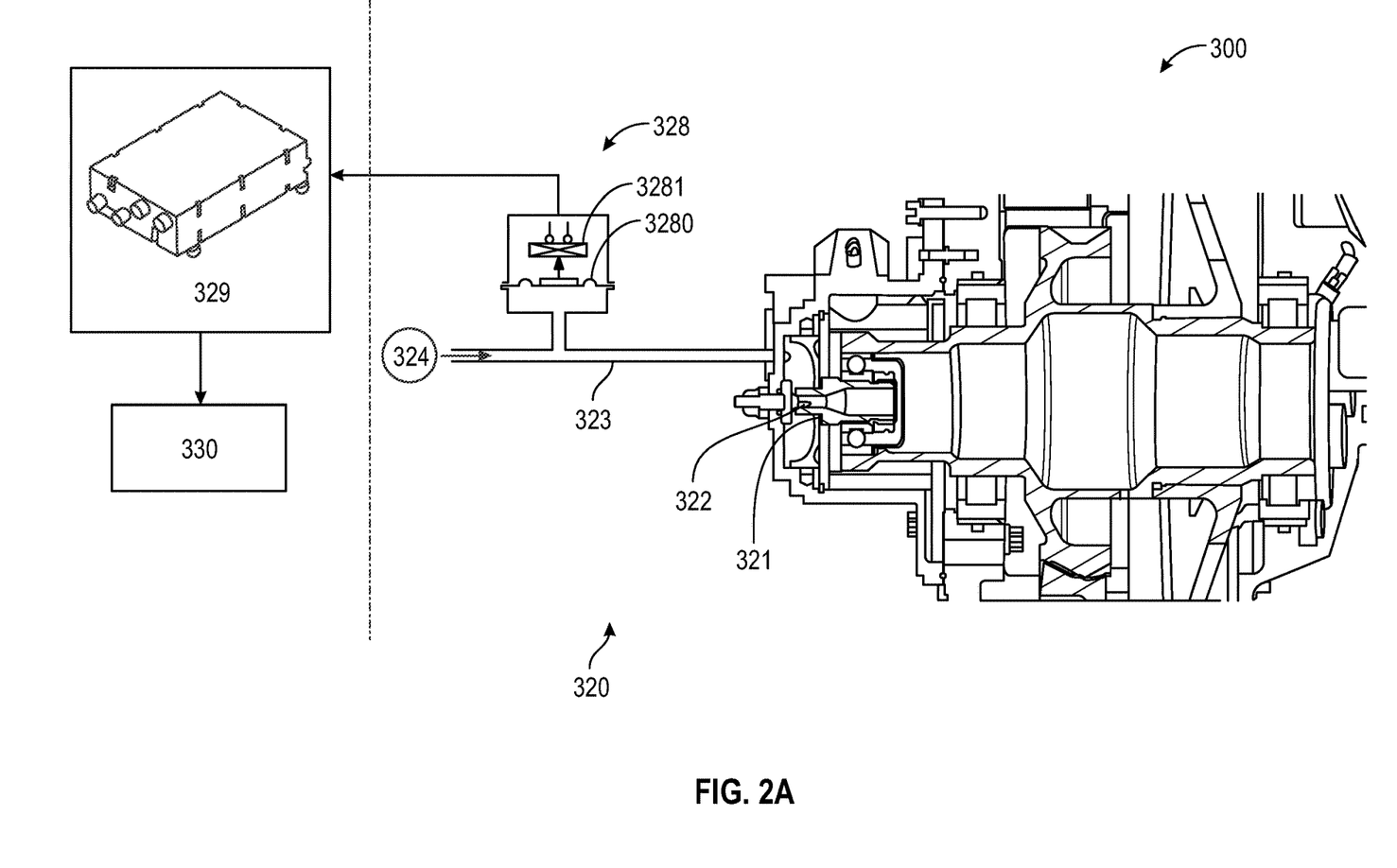
FIG. 2A shows schematically the implementation of the torque meter in the gearbox of FIG. 1, the gearbox being seen here in cross-section.
Figure 2B:
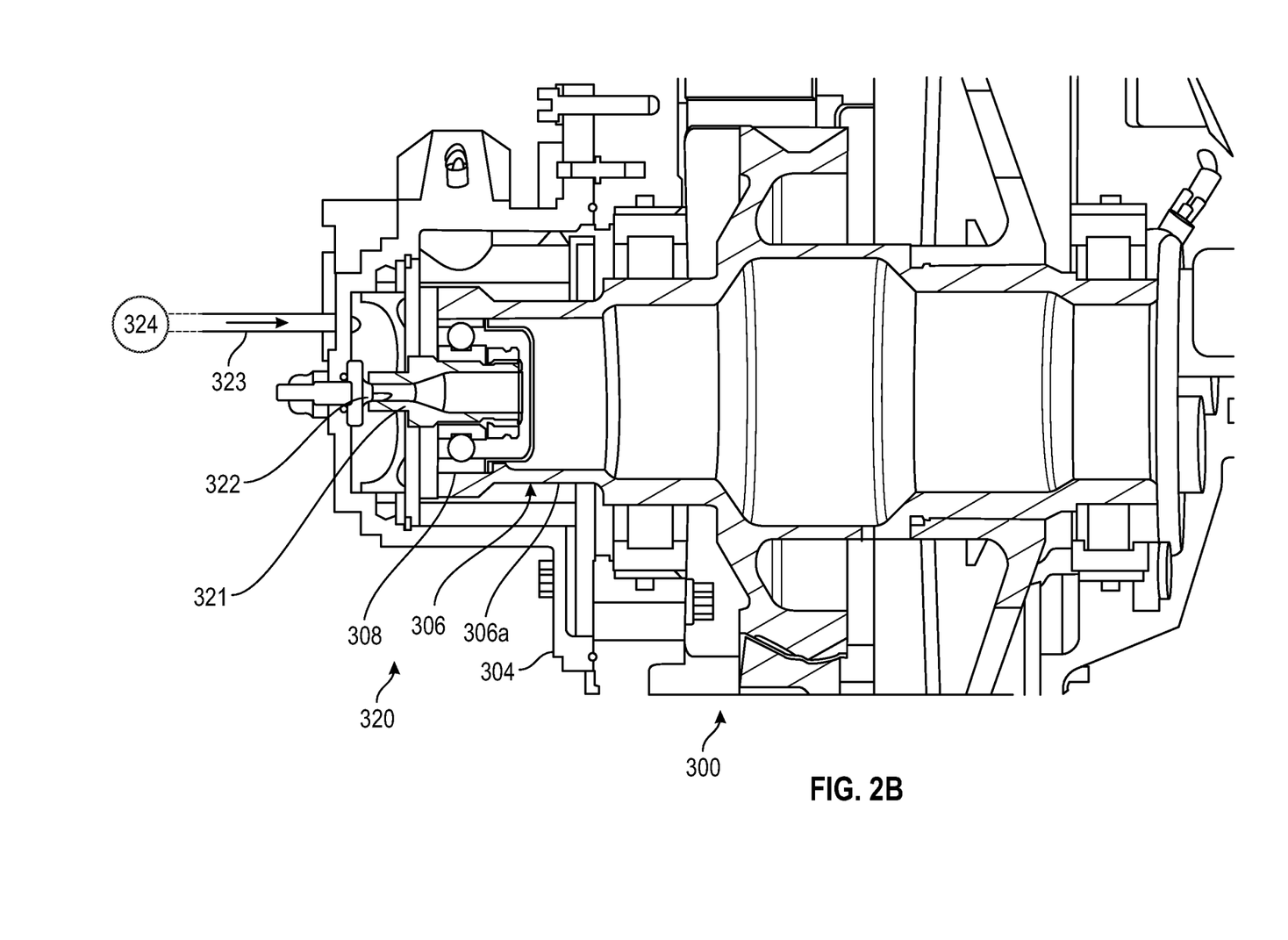
FIG. 2B is an enlargement of the cross-sectional view of the gearbox in FIGS. 1 and 2A.
Figure 3:
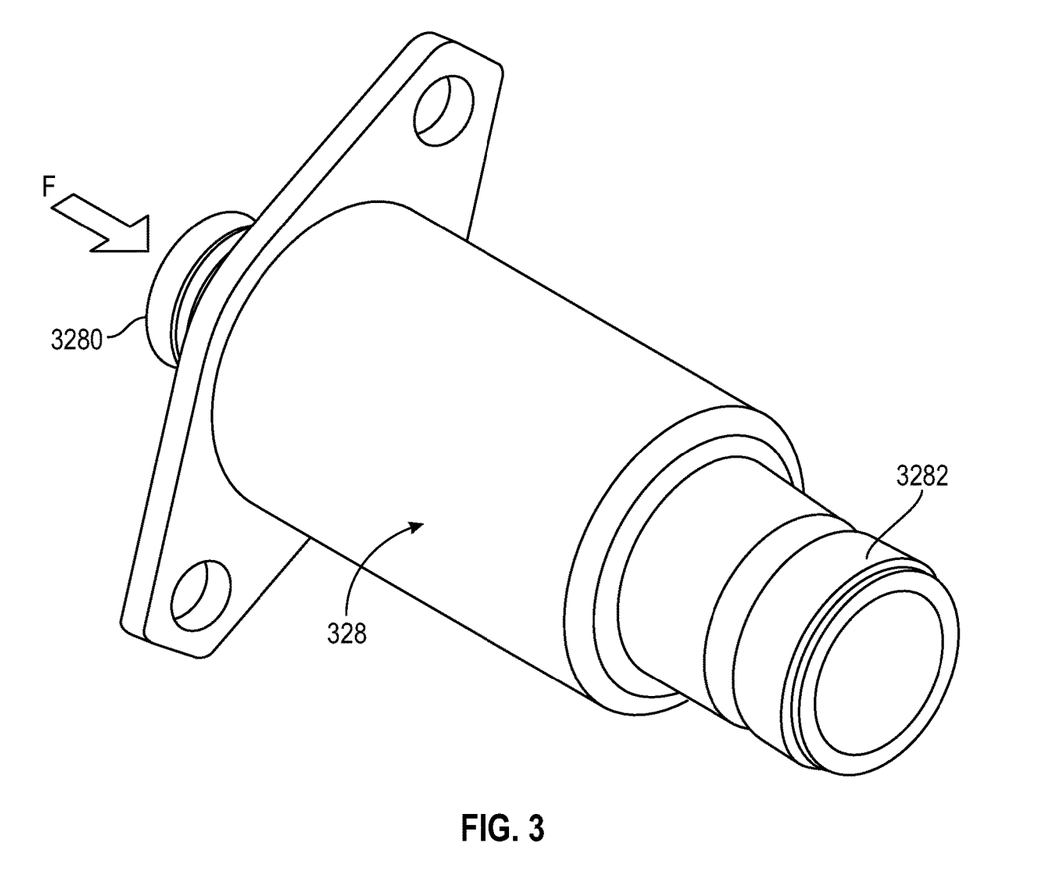
FIG. 3 is a perspective view of the pressure sensor in FIG. 1.

The cover 3210 of a hydraulic piston 321, described below, and a pump-filter support block carrying a pressure sensor 328, also described below, are visible on the gearbox 300 in FIG. 1. A cross-section of the gearbox 300 is shown in detail in FIG. 2B. The gearbox 300 has an envelope 304 and a sprocket 306, mounted rotatable in the envelope 304. A shaft 306a of the sprocket 306 is connected in pivot connection to the hydraulic piston 321 of the torque meter 320 by means of a bearing 308. The axial thrust exerted by the sprocket 306 on the piston 321 has the effect of regulating the opening of a flap 322, i.e. modulating the extent of oil leakage from a supply circuit 323 supplied from a pump 324 (FIGS. 2A and 2B). A balance is thus achieved between the axial thrust exerted by the sprocket 306 and the thrust of the hydraulic fluid on the piston 321. The pressure thus regulated in the supply circuit 323 is measured by the pressure sensor 328 (FIGS. 1, 2A, 3). The sensor 328 is here a hydraulic piston 3280 and a resistive element 3281. The pressure F exerted by the fluid on the hydraulic piston 3280 is transformed in 3281 into an output signal, in this case an electrical voltage proportional to the pressure of the fluid. An electric connector 3282 (FIG. 3) allows to transmit the output signal to a computing unit 329, which controls a visual indicator 330 in the cabin of the aircraft.

Another hydraulic torque meter is known from the document FR3025602. In this device, a rod 30 is movable in translation in a longitudinal direction under the effect of an axial thrust 31 representative of the torque to be measured. A hydraulic circuit 40 in which a fluid 38 circulates is provided. This torque meter also comprises a pressure-measuring capsule 46 comprising a pressure chamber 36 supplied with fluid from the hydraulic circuit 40. A flexible, sealed membrane 32 is in contact with the fluid in the pressure chamber 36, extends in a plane substantially perpendicular to the rod 30 and is securely connected to one end of the rod 30 so that a longitudinal displacement of the rod 30 causes a deformation of the membrane 32. This device further comprises a leakage orifice 44 for the fluid 38 from the pressure chamber 36, and a flap 48 configured to regulate the pressure of the fluid 38 in the pressure chamber 36 in accordance with the deformation of the membrane 32.

In this type of torque meter, the hydraulic pressure regulation is also provided by a supply of the continuous and excess hydraulic chamber, collected from the lubricating oil circuit of the engine. A flap limits the outflow of the hydraulic chamber, which automatically adjusts the pressure until it exactly compensates for the axial thrust of the intermediate sprocket.

The forms that this regulation device can take on the different engines concerned are quite diverse and can be improved. Their fundamental characteristics (in particular the opening of the flap-flow rate-differential pressure relationship) are not known experimentally, and their sensitivity to manufacturing tolerances must be determined on a case-by-case basis.

The torques during fast transient regime of the engine are not precisely measured because these systems rely on establishing a steady state that depends on the performance of the engine oil circuit. In particular, the measurement of the maximum torque reached during a transient regime is uncertain, which can lead to exceedances of the torque permissible by the engine without being detected by the regulation and monitoring system of the engine.

This type of system also represents an energy loss collected from the lubrication circuit.

The current systems act as an axial abutment for the intermediate sprocket, but only in one direction. In the other direction, a second axial abutment must be added.

The present disclosure aims to overcome the disadvantages of known solutions and proposes a simple, effective and economical solution to this problem. The present disclosure aims in particular to simplify the existing solutions and improve the reliability and the efficiency of the torque measurements.

SUMMARY

The disclosure thus concerns a hydraulic torque measurement device for gearbox of an aircraft engine unit comprising at least one sprocket having a shaft extending along a longitudinal axis, the hydraulic device comprising:

- an enclosure comprising a rigid wall and a deformable wall delimiting an internal volume, the deformable wall being configured to be connected in pivot connection to the shaft of the sprocket, and
- at least one pressure measurement element adapted to measure a pressure prevailing in the internal volume,
- the hydraulic device assuming a service state in which the internal volume is filled exclusively with an incompressible liquid, and in which the deformable wall is configured to be subjected to a pressure force. In this hydraulic torque measurement device, the enclosure is hermetically sealed.

The hydraulic torque measurement device according to the disclosure may comprise one or more of the following characteristics, considered independently or in combination with each other:
- the deformable wall is a metallic bellow;
- the metallic bellow is cylindrical in shape and deformable along an axial dimension;
- the hydraulic device further comprises a torque calculating means configured to calculate a torque from the pressure measured in the internal volume by the pressure measurement element.

The disclosure also relates to a gearbox for an aircraft engine unit, comprising an aforementioned hydraulic torque measurement device, the gearbox comprising at least one sprocket having a shaft extending along a longitudinal axis, the deformable wall being connected in pivot connection to the shaft.

The gearbox according to the disclosure may comprise one or more of the following characteristics, considered independently of each other or in combination with each other:
- the deformable wall is a cylindrical, deformable metallic bellow and extends coaxially to the longitudinal axis of the shaft of the sprocket;
- the rigid wall forms an integral portion of an envelope of the gearbox;
- the rigid wall comprises a filling and/or purging conduit, the filling and/or purging conduit being obturated in a service state of the hydraulic device.
- the rigid wall comprises a pressure measurement interface, the pressure measurement element being in communication with the internal volume by means of the pressure measurement interface;
- the gearbox is a helicopter main gearbox.

DESCRIPTION OF THE DRAWINGS

Further characteristics and advantages of the disclosure will become apparent from the following detailed description, for the understanding of which reference is made to the attached drawings in which.

DETAILED DESCRIPTION

Figure 4:
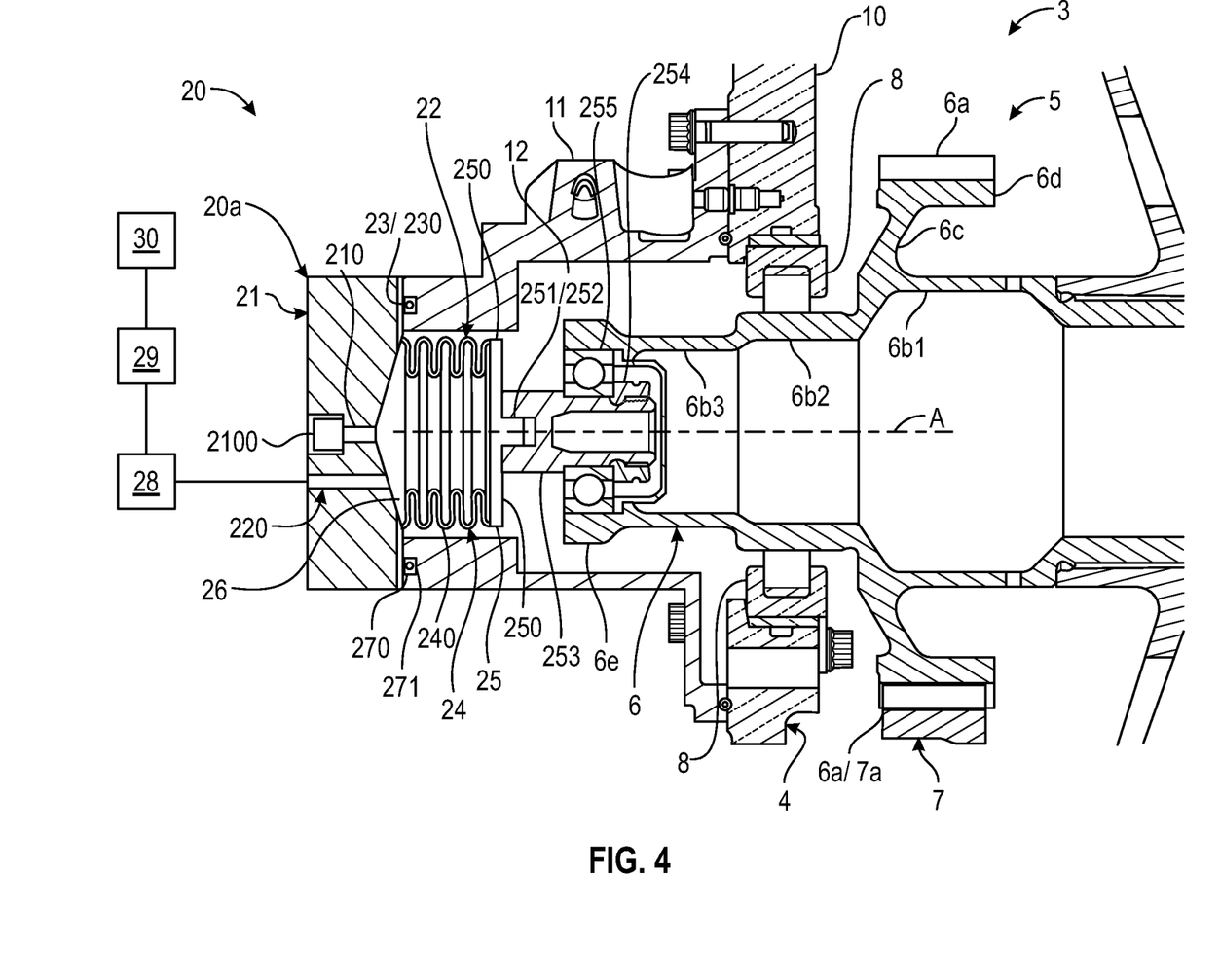
FIG. 4 is a cross-sectional view of a gearbox provided with a torque meter according to the disclosure.

In the following description, the disclosure is applied to a gearbox 3, for example a main gearbox of a helicopter engine unit (not shown). However, the gearbox is not limited to this type of engine unit and can be applied to other types of engine units, as well as to other types of aircraft, in particular when a torque is to be measured.

The gearbox 3 comprises a rigid envelope 4 and a set of sprockets 5. The set of sprockets 5 comprises at least one first sprocket 6 and a second sprocket 7, which engage with each other at the level of teeth 6a and 7a respectively. The set of sprockets 5 belongs to a reducer of the gearbox 3 which is not shown in detail. The sprocket 6 is for example, but not exclusively, an intermediate sprocket of this reducer.

The sprocket 6 extends generally around a longitudinal axis A and is rotatable about it. The teeth 6a of the sprocket 6 are evenly distributed around the longitudinal axis A.

In the example shown, the sprocket 6 comprises a shaft 6b about which it is configured to rotate. The shaft 6b is here a hollow shaft and has a succession of hollow cylindrical segments 6b1, 6b2, 6b3, each of decreasing diameter towards a hydraulic torque meter 20 described below.

A web 6c extends here from the end of the cylindrical segment 6b1 adjacent to the cylindrical segment 6b2. The web 6c carries a cylindrical ring gear 6d provided with teeth 6a. A distal end 6e extends to the end of the cylindrical portion 6b3.

The envelope 4 comprises a plurality of walls, of which only two walls 10 and 11 are shown here. The wall 11 delimits an internal volume 12 in which the end 6e and the cylindrical segments 6b2 and 6b3 of the sprocket 6 are housed. The sprocket 6 is thus mounted rotatable in the envelope 4 by means of a bearing 8. In this example, the bearing 8 is not limited to a roll bearing.

As mentioned above, the gearbox 3 also comprises a hydraulic torque measurement device 20, also referred to as a hydraulic torque meter. The torque meter 20 is designed to measure the axial thrust of one of the sprockets of the set of sprockets 5, for example during a start-up phase of the engine or in steady regime. Here, the torque meter 20 is a generally elongated element aligned with the aforementioned longitudinal axis A, i.e. coaxial with the axis on which the sprocket 6 is centered.

The hydraulic torque meter 20 has an enclosure 20a comprising a rigid wall 21 and a deformable wall 22. As will become apparent below, the enclosure 20a is hermetically sealed.

The walls 21 and 22 delimit between them a hydraulic chamber 26. In a service state of the hydraulic torque meter 20, the chamber 26 is filled (exclusively) with incompressible liquid, for example engine oil.

The deformable wall 22 is a metallic bellow. The deformable wall 22 is generally cylindrical in shape. The deformable wall 22 is provided coaxial to the longitudinal axis A of the shaft 6b in a service state of the torque meter 20. The deformable wall 22 has a low axial stiffness around a rest position. The rest position of the deformable wall 22 is defined in a situation in which no axial pressure directly related to the movement of a rotating element, such as the sprocket 6, is exerted on the deformable wall.

The deformable wall 22 comprises a first end portion 23, a central portion 24 and a second end portion 25.

The first end portion 23 comprises, but is not limited to, an annular flange 230 intended to ensure the installation of the torque meter 20 in the gearbox 3.

The central portion 24 forms the main body of the metallic bellow itself. The central portion 24 has a generally cylindrical shape. It takes the form of a succession of folds of a metallic sheet on itself. The term fold should be understood as referring to a layer, in comparison with the immediately adjacent folds, or layers. The number of folds can be chosen in a non-limiting way between 2 and 20, preferably between 4 and 12.

The second end portion 25 forms a connection means with the shaft 6b of the sprocket 6 and here comprises a plate 250, a socket 253, an attachment ring 254 and a bearing 255.

The plate 250 is disc-shaped. The plate 250 is provided with a pin 251. The plate 250 is mounted at the end of the central portion 24 opposite the first end portion 23. The pin 251 projects from the center of the disc formed by the plate 250, on the face of it opposite the central portion 24. The pin 251 has a thread 252 on its peripheral cylindrical surface.

The socket 253 is a cylindrical element. The socket 253 has a substantially cross-section shaped like a H delimiting two cavities opposite each other. The socket 253 has an internal thread in one of its cavities. This inner thread allows it to be screwed onto the pin 251 so as to be attached to the latter.

The socket 253 is furthermore mounted rotatable in the end 6e and inside the cylindrical segment 6b3 of the sprocket 6 by means of the bearing 255, which is here a ball bearing, and the attachment ring 254.

The torque meter 20 is also installed in the gearbox 3 as follows.

In the non-limiting example shown, the rigid wall 21 is an integral portion of the aforementioned envelope 4. In other words, the wall 21 acts as a cover for the envelope 4, obturating the internal volume 12.

The wall 21 is attached to the wall 11, preferably by screwing but not restrictively. The walls 11 and 21 sandwich, i.e. clamp, the annular flange 230 between them. The annular flange 230 is thus mounted in a sealed manner between the walls 11 and 21 of the envelope 4.

Thus, in addition to being mounted in rotation at its second end portion 25 relative to the end 6e of the sprocket 6, the deformable wall 22 is attached at its first end 23 relative to the envelope 4.

A gorge 271 housing an O-ring 270 is provided in the end plane B of the wall 11 on which the annular flange 230 comes into contact when the torque meter 20 is assembled. The sealing to the fluids is thus ensured between the wall 11 and the annular flange 230.

In the configuration described above, it can be seen that the sprocket 6 is mounted in pivot connection in the envelope 4 by means of the bearing 8. The sprocket 6 is also in pivot connection with the bellow 22. Specifically, the second end portion 25 of the bellow 22 is in pivot connection with the shaft 6b by means of the bearing 255. In other words, a rotation of the sprocket 6 will not drive in rotation the bellow 22. However, any axial pressure along the axis A, whether negative or positive, i.e. in either orientations in the direction of the axis A as shown in FIG. 4, will be reflected on the bellow 22 along the axis A and will tend to vary the pressure of the liquid in the hydraulic chamber 26. The torque meter 20 thus forms an axial abutment for the sprocket 6.

Here, the wall 21 is passed through by a first conduit 210, which is obturated in a sealing manner by a plug 2100 in a service state of the torque meter 20 and/or the gearbox 3.

The conduit 210 forms a filling and purging conduit. The plug 211 is configured to obturate the conduit 210 in a service state of the torque meter 20.

The wall 21 is also passed through by a second conduit 220. The conduit 220 forms a pressure measurement interface. In other words, the conduit 220 is in fluid communication with a pressure measurement device not shown.

The torque meter comprises at least one pressure measurement element 28 of the pressure sensor type. The pressure measurement element 28 is in communication with the hydraulic chamber 26 by means of the conduit 220. The purpose of the pressure measurement element 28 is to measure the pressure and its changes in the hydraulic chamber 26.

Alternatively, the torque meter 20 has a second pressure measurement element. This is for example advantageous to face with failures of either the first or the second pressure measurement element and/or to have a redundant pressure measurement to improve the reliability of the measurement. The pressure measurement interface can then be provided to communicate with both pressure measurement elements. Alternatively, not shown, a pressure measurement interface is provided through the rigid wall 21 for each pressure measurement element.

The torque meter also comprises a torque calculating means 29 configured to calculate an engine torque from the pressure measured in the internal volume by the at least one pressure measurement element 28. Where appropriate, the measured torque may be displayed on an indicator 30, for example in the cabin of the aircraft.

The term hermetically sealed means that the enclosure 20a is devoid of continuous supply of incompressible liquid circuit and of drainage circuit for this liquid. In other words, the hydraulic chamber 26 delimited by the walls 21 and 22 is filled with incompressible liquid during a preparation operation of the torque meter 20 (for example: an initial purging and filling operation of the hydraulic chamber 26, or a subsequent maintenance operation of the torque meter 20) but is not passed through by a flow of incompressible liquid in the service state of the hydraulic torque meter 20.

The hydraulic torque meter 20 described above can advantageously be implemented in a gearbox of an aircraft such as a helicopter or an airplane.

The disclosure provides the following advantages. The proposed solution eliminates the automatic pressure regulation system of the prior art, and with it:

the need do have an engine oil supply circuit collected from the general lubrication circuit;
the associated regulation flap.

The main contribution of this solution is therefore to greatly simplify the known hydraulic torque meters with various advantages.

The hydraulic torque meter 20 thus offers a greater reliability. The torque measurement becomes instantaneous and is now independent of the engine regime. It is no longer necessary to wait for reaching a state of equilibrium that is partly dependent on the lubrication circuit of the engine. The torques are therefore measured in transient regime with the same precision as in steady regime.

This device provides a bi-directional axial abutment for the sprocket 6. If necessary, it is possible to measure negative torques.

The metallic bellow 22 will be chosen to be sufficiently flexible axially to avoid a significant increase in the internal pressure of the hydraulic chamber 26 caused by the thermal expansion of the liquid filling it. The metallic bellow 22 will also be chosen to be sufficiently strong radially to withstand the internal pressure of the liquid under the effect of a large torque (up to a maximum of 10 bar) and its repeated cycles (fatigue design).

Advantageously, the pressure measurement element 28 may be chosen to be both a pressure and a temperature sensor (not shown) to allow the pressure increase caused by a thermal expansion of the liquid to be taken into account. It is then possible to eliminate the thermal component of the pressure measurement by software.

Advantageously, in order to allow a perfect purging of the hydraulic chamber 26, the enclosure-pressure sensor assembly can be equipped and previously filled and purged in the workshop, and composed of the following elements:

enclosure 20a purged and filled;
pressure sensor or sensors 28.

It is thus possible to replace this assembly 20a, 28, which forms an axial abutment for the sprocket 6 installed in the gearbox 3, without having to dismantle the reducer. This allows to save a lot of time during maintenance operations.

The filling and purging conduit 210 allows to remove any air bubbles when filling the hydraulic chamber 26.

The invention claimed is:

1. A hydraulic torque measurement device for a gearbox of an aircraft engine unit comprising at least one sprocket having a shaft extending along a longitudinal axis, the hydraulic torque measurement device comprising:

an enclosure comprising a rigid wall and a deformable wall delimiting an internal volume, the deformable wall being configured to be pivotally connected to the shaft of the sprocket, and at least one pressure measurement element adapted to measure a pressure prevailing in said internal volume, the hydraulic torque measurement device allowing a service state in which the internal volume is filled exclusively with an incompressible liquid, and in which the deformable wall is configured to be subjected to a pressure force, wherein the enclosure is hermetically sealed.

2. The hydraulic torque measurement device according to claim 1, wherein the deformable wall is a metallic bellow.

3. The hydraulic torque measurement device according to claim 2, the metallic bellow is cylindrical in shape and deformable along an axial dimension.

4. The hydraulic torque measurement device according to claim 1, further comprising a torque calculating means configured to calculate a torque from the pressure measured in the internal volume by the pressure measurement element.

5. A gearbox for aircraft engine unit, comprising a hydraulic torque measurement device according to claim 1, the gearbox comprising at least one sprocket having a shaft extending along a longitudinal axis (A), the deformable wall being pivotally connected to the shaft.

6. The gearbox according to claim 5, wherein the deformable wall is a cylindrical, metallic bellow that is deformable along an axial dimension and extends coaxially to the longitudinal axis (A) of the shaft of the sprocket.

7. The gearbox according to claim 5, wherein the rigid wall forms an integral portion of an envelope of the gearbox.

8. A gearbox for aircraft engine unit, the gearbox comprising a hydraulic torque measurement that includes a hydraulic torque measurement device having at least one sprocket with a shaft extending along a longitudinal axis, the hydraulic torque measurement device comprising:

an enclosure comprising a rigid wall and a deformable wall delimiting an internal volume, the deformable wall being configured to be pivotally connected to the shaft of the sprocket, and at least one pressure measurement element adapted to measure a pressure prevailing in said internal volume, the hydraulic torque measurement device allowing a service state in which the internal volume is filled exclusively with an incompressible liquid, and in which the deformable wall is configured to be subjected to a pressure force, wherein the enclosure is hermetically sealed, the gearbox comprises at least one sprocket having a shaft extending along a longitudinal axis (A), the deformable wall is pivotally connected to the shaft, and the rigid wall comprises a filling and purging conduit, said filling and purging conduit being obturated in a service state of the hydraulic device.

9. The gearbox according to claim 5, wherein the rigid wall comprises a pressure measurement interface, said pressure measurement element being in communication with the internal volume by means of the pressure measurement interface.

10. The gearbox according to claim 5, wherein the gearbox is a helicopter main gearbox.

11. A hydraulic torque measurement device for a gearbox of an aircraft engine unit comprising at least one sprocket having a shaft extending along a longitudinal axis, the hydraulic torque measurement device comprising:

an enclosure comprising a rigid wall and a deformable wall delimiting an internal volume, the deformable wall being configured to be pivotally connected to the shaft of the sprocket, and at least one pressure measurement element adapted to measure a pressure prevailing in said internal volume, the hydraulic torque measurement device allowing a service state in which the internal volume is filled exclusively with an incompressible liquid, and in which the deformable wall is configured to be subjected to a pressure force, wherein the enclosure is hermetically sealed, and wherein the rigid wall comprises a filling and purging conduit, said filling and purging conduit being obturated in a service state of the hydraulic device.

* * * * *